United States Patent
Klein et al.

(10) Patent No.: US 12,109,514 B2
(45) Date of Patent: Oct. 8, 2024

(54) FILTER DEVICE WITH AN ELEMENT RECEPTACLE HAVING TWO OR MORE DEGREES OF FREEDOM RELATIVE TO DIFFERENT AXES

(71) Applicant: HYDAC FILTERTECHNIK GMBH, Sulzbach/Saar (DE)

(72) Inventors: Volkmar Klein, Zweibrücken (DE); Stefan Hennes, Neunkirchen (DE)

(73) Assignee: HYDAC FILTERTECHNIK GMBH, Sulzbach Saar (DE)

( * ) Notice: Subject to any disclaimer, the term of this patent is extended or adjusted under 35 U.S.C. 154(b) by 512 days.

(21) Appl. No.: 17/290,805

(22) PCT Filed: Nov. 12, 2019

(86) PCT No.: PCT/EP2019/081063
§ 371 (c)(1),
(2) Date: May 3, 2021

(87) PCT Pub. No.: WO2020/104260
PCT Pub. Date: May 28, 2020

(65) Prior Publication Data
US 2021/0370202 A1 Dec. 2, 2021

(30) Foreign Application Priority Data
Nov. 23, 2018 (DE) .................... 10 2018 009 187.3

(51) Int. Cl.
*B01D 29/15* (2006.01)
*B01D 29/96* (2006.01)
(Continued)

(52) U.S. Cl.
CPC ............. *B01D 29/15* (2013.01); *B01D 29/96* (2013.01); *B01D 35/147* (2013.01);
(Continued)

(58) Field of Classification Search
CPC .. B01D 29/96; B01D 35/147; B01D 35/0276; B01D 29/15; B01D 35/306;
(Continued)

(56) References Cited

U.S. PATENT DOCUMENTS 8,286,804 B2 * 10/2012 Weindorf ............. B01D 35/147
210/441
2010/0264078 A1 * 10/2010 Bassett .................. B01D 35/30
210/435
(Continued)

FOREIGN PATENT DOCUMENTS

DE  101 42 774      3/2003
DE  10 2009 049 868  4/2011
(Continued)

OTHER PUBLICATIONS

International Search Report (ISR) issued Feb. 7, 2020 in International (PCT) Application No. PCT/EP2019/081063.

*Primary Examiner* — Hayden Brewster
(74) *Attorney, Agent, or Firm* — WENDEROTH, LIND & PONACK, L.L.P.

(57) ABSTRACT

A filter device has a filter housing (2) and a filter element (15) accommodated in the filter housing. The element material (44) of the filter element for filtering a liquid extends between two end caps (40, 42). At least one end cap (40) is mounted on an element receptacle (14). A bearing (46, 54), providing more than one degree of freedom, is used to articulate the filter element (15) on the element receptacle (14) via its one end cap (40). The bearing has a convex bearing surface (46) that is guided in a concave bearing surface (54). The respective bearing surface (46, 54) is part of a respective shell (55a, 55b). At least one shell (55b) has a passage (55c) for liquid media.

23 Claims, 3 Drawing Sheets

(51) Int. Cl.
  *B01D 35/147* (2006.01)
  *B01D 35/30* (2006.01)
(52) U.S. Cl.
  CPC ...... *B01D 35/306* (2013.01); *B01D 2201/295* (2013.01); *B01D 2201/301* (2013.01); *B01D 2201/4076* (2013.01); *B01D 2201/4084* (2013.01); *B01D 2201/4092* (2013.01)
(58) Field of Classification Search
  CPC ........ B01D 2201/295; B01D 2201/301; B01D 2201/4076; B01D 2201/4084; B01D 2201/4092
  USPC ....................................................... 210/232
  See application file for complete search history.

(56) References Cited

U.S. PATENT DOCUMENTS

| | | | |
|---|---|---|---|
| 2012/0261326 A1 | 10/2012 | Deschamps et al. | |
| 2018/0161703 A1 | 6/2018 | Bautz et al. | |
| 2018/0328244 A1* | 11/2018 | Ardes .................. | B01D 29/96 |

FOREIGN PATENT DOCUMENTS

| | | | |
|---|---|---|---|
| DE | 10 2014 002 241 | 8/2015 | |
| DE | 10 2014 211 799 | 11/2015 | |
| DE | 10 2015 007 692 | 12/2016 | |
| DE | 102015007692 A1 * | 12/2016 | ........... B01D 29/232 |
| WO | 02/076570 | 10/2002 | |
| WO | 2007/003517 | 1/2007 | |

* cited by examiner

FILTER DEVICE WITH AN ELEMENT RECEPTACLE HAVING TWO OR MORE DEGREES OF FREEDOM RELATIVE TO DIFFERENT AXES

FIELD OF THE INVENTION

The invention relates to a filter device having a filter housing and a filter element accommodated therein. The element or filter material, which separates contaminants from a fluid, of the filter element for filtering a liquid extends between two end caps. At least one end cap is mounted on an element receptacle. A bearing, providing more than one degree of freedom, is used to articulate the filter element on the element receptacle via that one end cap.

BACKGROUND OF THE INVENTION

Filter devices are known in the prior art, see for instance DE 101 42 774 A1. In filter devices of this type in which, as in the case of this document, element mounts are connected to the housing parts, such as housing connectors and/or connectors on the housing cover, in a form-fitting manner. The manufacture of filter housings and filter housing parts has to conform to extremely tight tolerances to ensure that the axes of the respective element mounts of the end caps are precisely aligned with the axes of the retaining elements, such as connectors, at the housing end and/or at the cover end. Manufacturing tolerances in the production of housings, in particular in the case of multi-part housing constructions having several adjacent housing parts, can lead to misalignments causing tensions in the filter element, resulting in malfunctions or even damage. In particular filter devices having long filter elements are affected by this problem, because even the smallest angular errors and positional deviations entail large misalignments at the opposite retaining element.

WO 02/076570 A1, WO 2007/003517 A2 and DE 10 2014 002 241 A1 disclose other filtering devices.

SUMMARY OF THE INVENTION

In view of this problem, the invention addresses the problem of providing a filter device of the genus mentioned at the outset, which can be manufactured rationally and inexpensively and at the same time is characterized by safe operating behavior.

According to the invention, this problem is basically solved by a filter device having, as an essential feature of the invention, a bearing with a convex bearing surface that is guided in a concave bearing surface and that the respective bearing surface is part of a shell, with at least one of the bearing surfaces including a passage for liquid media.

A shell in terms of the invention and as defined in engineering mechanics is a planar supporting structure that has a doubly curved surface and that, in particular, can absorb loads both perpendicularly and in its plane. Shells make optimum use of their load-bearing capacity by distributing loads via membrane forces that are constant across the thickness of the shell, so that the shells have a high stiffness at a low weight.

A particular advantage of this design of bearing using shells is the passage being sealed off from the feed side of the filter device on the outside of the filter element.

It is further provided that the filter element is articulated to the element mount via its one end cap by a bearing providing more than one degree of freedom. This bearing provides a compensation option for possibly occurring misalignment errors to enable a reduction of the narrow tolerance limits that have to be observed for manufacture. Thus, filter devices can be produced having long filter elements or having assembled filter housings in an operationally reliable manner and at favorable manufacturing costs.

Advantageously, the arrangement can be made in such a way that the bearing has at least one convex bearing surface guided in at least one concave bearing surface. In this way, a spherical bearing is formed, which forms a kind of ball joint between the respective end cap and the element receptacle to compensate for misalignments without tensioning.

The respective convex bearing surface may be part of the element receptacle. The respective concave bearing surface is part of the one end cap. Because of the spherical shape of the element receptacle, the bearing surface of the filter element can easily be pushed onto the bearing surface of the element receptacle.

In preferred exemplary embodiments, the two bearing surfaces, in contact with each other in the manner of a plug-in or clamp connection, are spherical. The matching bulges then form an axial safeguard for the filter element, the end cap of which is put onto the element receptacle.

In advantageous exemplary embodiments, the element receptacle is secured in the filter housing preferably by a screw connection. The longitudinal axis of the filter element can in sections be swiveled out of the longitudinal axis of the element receptacle in all directions by a predeterminable swivel angle by the spherical bearing.

In particularly advantageous exemplary embodiments, a blocking device is provided, which delimits the maximum possible swivel-out angle of the filter element, which acts between the end cap of the filter element and the element mount and which is formed by these two. The limitation of the maximum inclination of the unit comprising the filter element and the element mount facilitates handling when inserting the filter element into the filter housing.

With particular advantage, the arrangement may be such that a further blocking device is provided. When the element receptacle of the filter element is screwed onto a housing mount, arranged inside the filter housing, the further blocking device prevents the swivel motion out of the basic position, in which the longitudinal axes of the one end cap and the assigned element receptacle are congruent with each other. When the element receptacle is secured to the housing mount and in the event of further rotational motion of the one end cap relative to the element receptacle, preferably in the screw-on direction, the further blocking device permits the swivel motion from the basic position. When the further blocking device is in the active state, for the installation process of the filter element in the filter housing, the filter element together with the element receptacle is available as a rigid unit having aligned axes. This setup forms a particularly effective assembly aid in the assembly process, in which the element receptacle has to be engaged with the thread of the housing mount, which is difficult to access inside the housing. Because the blocking device is deactivated in the course of screwing-on the filter element, it is simultaneously ensured that the spherical bearing for compensating possible misalignments is effective when the installation screw process is completed.

In advantageous exemplary embodiments, the further end cap of the filter element is secured to a further housing mount inside the filter housing. The further housing mount is preferably part of a housing cover that is secured to a filter head as part of the filter housing, in particular at least one screw connection. The further housing mount may be formed by a connector of the housing cover, which engages with an opening of the assigned end cap of the filter element. The connector may form a closure of this end cap or a fluid path leading from the filter head to the interior of the filter element.

Advantageously, the one housing mount may have at least one spring-loaded bypass valve, which, in its open position, while at least partially bypassing the filter element, releases the fluid path from the inside of the filter housing to its outlet. The fluid path may be routed via a cavity formed by the one end cap, which is sealed to the housing mount. That cavity contains a screen mesh through which the fluid flows when the bypass valve is open.

The subject matter of the invention is also a filter element, which is provided in particular for a filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
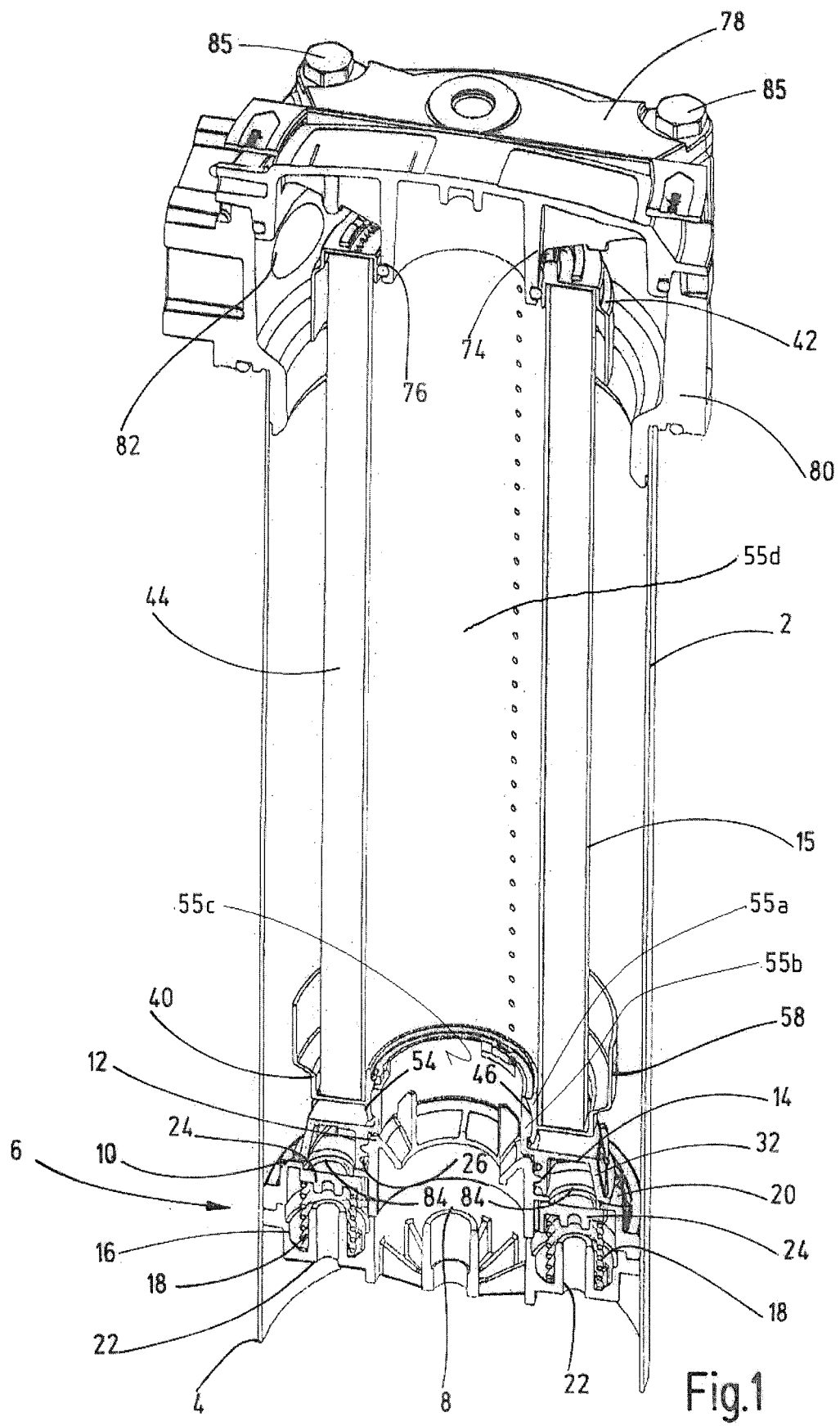
FIG. 1 is a perspective view, sectioned in a central and vertical sectional plane, of a filter device according to an exemplary embodiment of the invention.

With reference to the drawings, the invention is explained by way of example of an in-tank filter device, which has a filter housing 2 in the form of a tubular body open at its lower end 4. The invention is equally advantageously implemented in a filter device that provides a filter housing in the form of a filter bowl closed at the bottom. Near the lower end 4, a housing mount 6 is secured to the inside of the tubular body of the filter housing 2. The housing mount 6 is formed by a two-part annular body having a coaxial internal passage 8. At the top part 10 of housing mount 6, the passage 8 continues with an upwardly projecting threaded connector 12 with a male thread to which the female thread of a threaded ring 26 of an element receptacle 14 can be screwed for the support a filter element 15. The female thread can be used to detachably secure the element receptacle 14 in the filter housing 2. In the lower part 16 of the housing mount 6, valve chambers 18 are arranged distributed around the outside of the central passage 8 for bypass valves to be formed. The bypass valves have fluid passages from an upper circular ring surface 20 of the upper part 10 to fluid passages 22 on the lower part 16. The fluid passages 22 are normally closed by spring-loaded closing elements 24.

FIG. 1 shows the filter element 15 in the installed functional position, in which the threaded ring 26, projecting coaxially downward from the element receptacle 14, is screwed to the threaded connector 12 of the housing mount 6. For the tightened screw connection, the end 28 (see FIG. 2) of the threaded ring 26 contacts the circular ring surface 20 of the upper part 10. As can be seen most clearly from FIG. 2, the threaded ring 26 extends from the underside of a planar annular top surface 30, extending in a radial plane, of the element receptacle 14. From the outer periphery of the top surface 30 a bell-like or bell-shaped sleeve 32 extends toward the threaded ring 26. The sleeve 32 has wall openings 34 and delimits an annular space 36 between itself and the threaded ring 26. In the screwed functional position, shown in FIG. 1, the lower annular edge 38 of the sleeve 32, like the end 28 of the threaded ring 26, is in contact with the circular ring surface 20 of the upper part 10 of the housing mount 6.

In a conventional manner, the filter element 15 has an element material 44, extending between the end caps 40 and 42, in the form of a hollow cylinder. The one end cap 40, shown at the bottom in FIG. 1, of the end caps 40, 42 is supported on the element receptacle 14. To form the bearing, the element receptacle 14, see FIGS. 2 to 4, has a tubular body 48 projecting coaxially upwards from the cover surface 30, The radially outer wall of the tubular body 48 forms a bearing surface 46 in the form of a convexly curved annular surface. The end cap 40 has, starting from the radially inner edge of a flat contact surface 50 for the front end of the element material 44, an upwardly and downwardly projecting tubular body 52. The radially inner wall of tubular body 52 forms the second bearing surface 54 in the form of a concavely curved annular surface.

Figure 2:
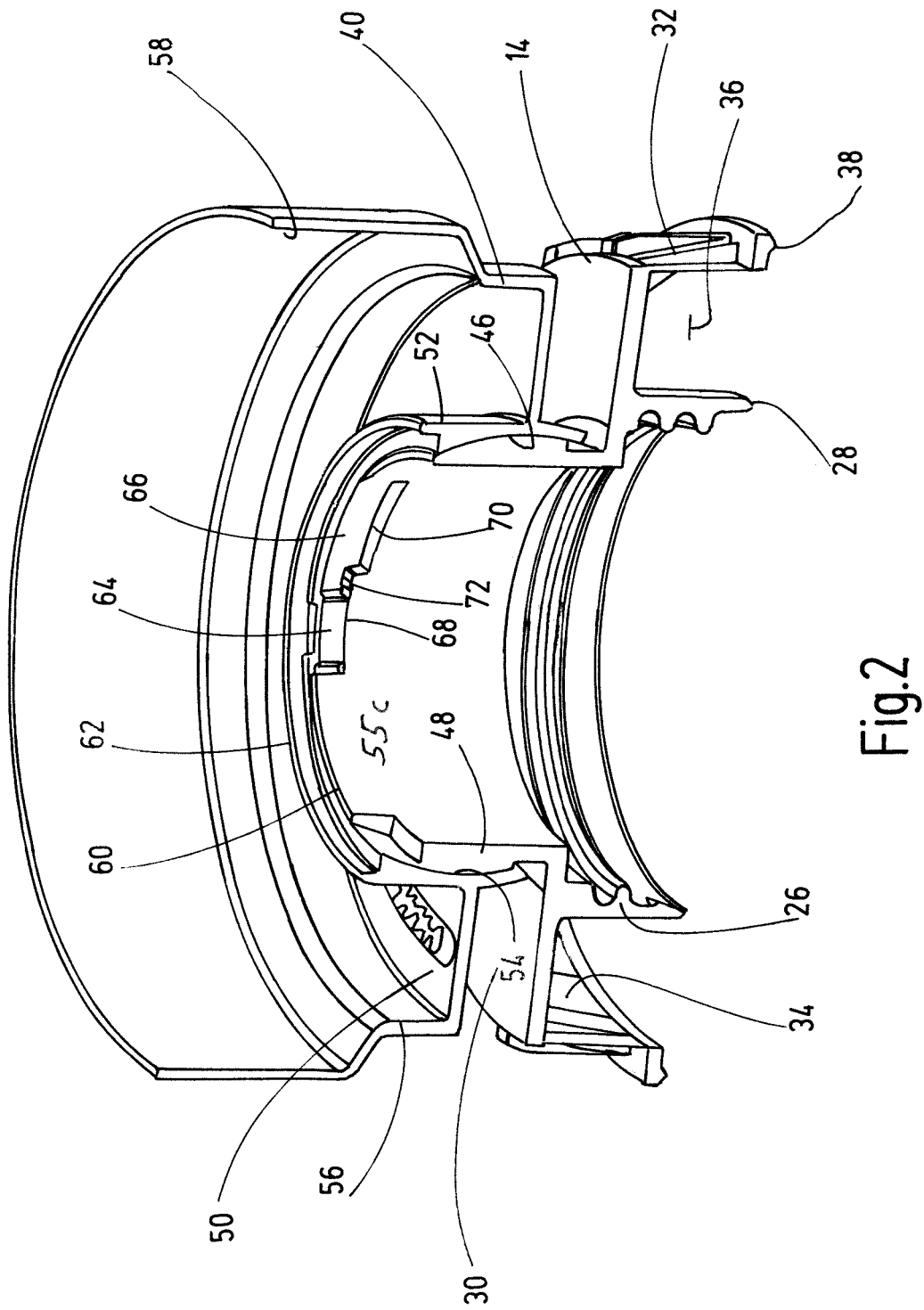
FIG. 2 is an enlarged partial perspective view, sectioned in a central vertical plane, of the one end cap and its assigned element receptacle of the filter element of the exemplary embodiment.

The figures, see in particular FIG. 2, show the bearing state, in which the tubular body 52 of the end cap 40 is fitted onto the tubular body 48 of the element receptacle 14. Elastic flexibility, in particular of the tubular body 48 free-standing on the cover surface 30, can be used to latch the bearing to the adjoining bearing surfaces 46, 54. The contact of the convex bearing surface 46 with the concave bearing surface 54 forms a spherical bearing in the manner of a ball joint between the end cap 40 and the element receptacle 14. The respective bearing surface 46, 54 is constituent part of membrane-like or membrane-shaped shell 55a, 55b. At least one shell 55b has a passage 55c for fluid, which is connected to a cavity 55d in the filter element in a fluid-conveying manner. The enclosure for the element or filter material 44, which separates contaminants from a fluid, contacting on the contacting surface 50 of the end cap 40, is formed on the radial inside by the tubular body 52 and on the radial outside by a sleeve surface 56, which widens upward in the radial direction to form a shell 58 surrounding the end part of the element material 44 at a radial distance.

Figure 4:
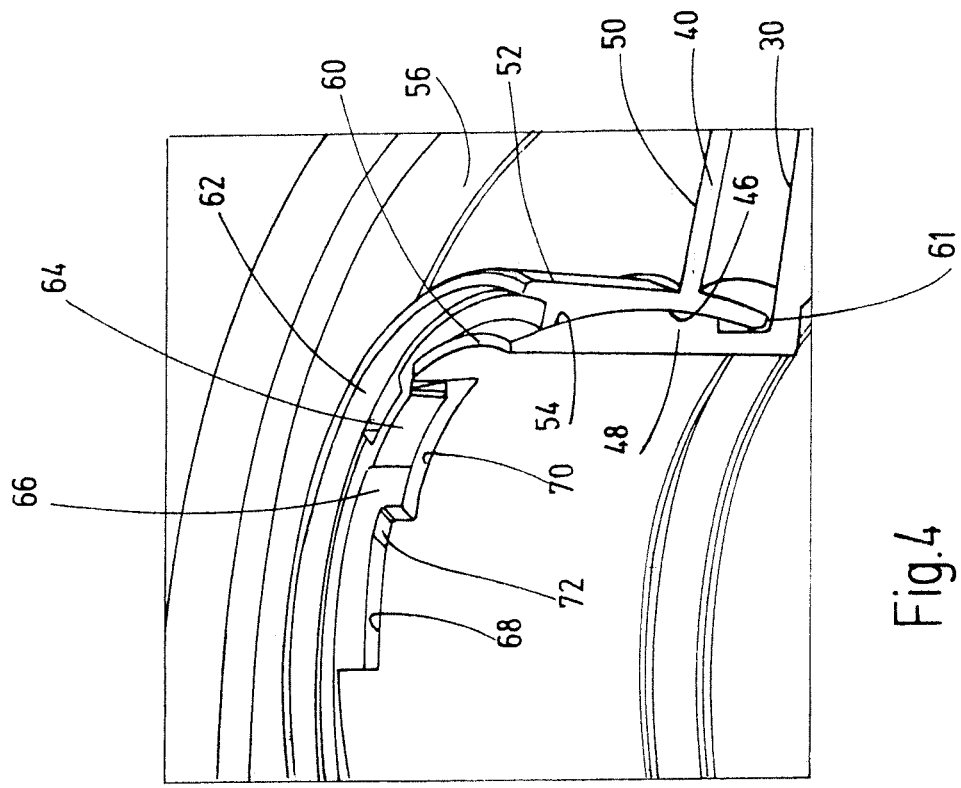
FIG. 4 is a further enlarged partial perspective view in section showing the area of two blocking devices of the exemplary embodiment with one of the blocking devices being shown in the releasing position.
Figure 3:
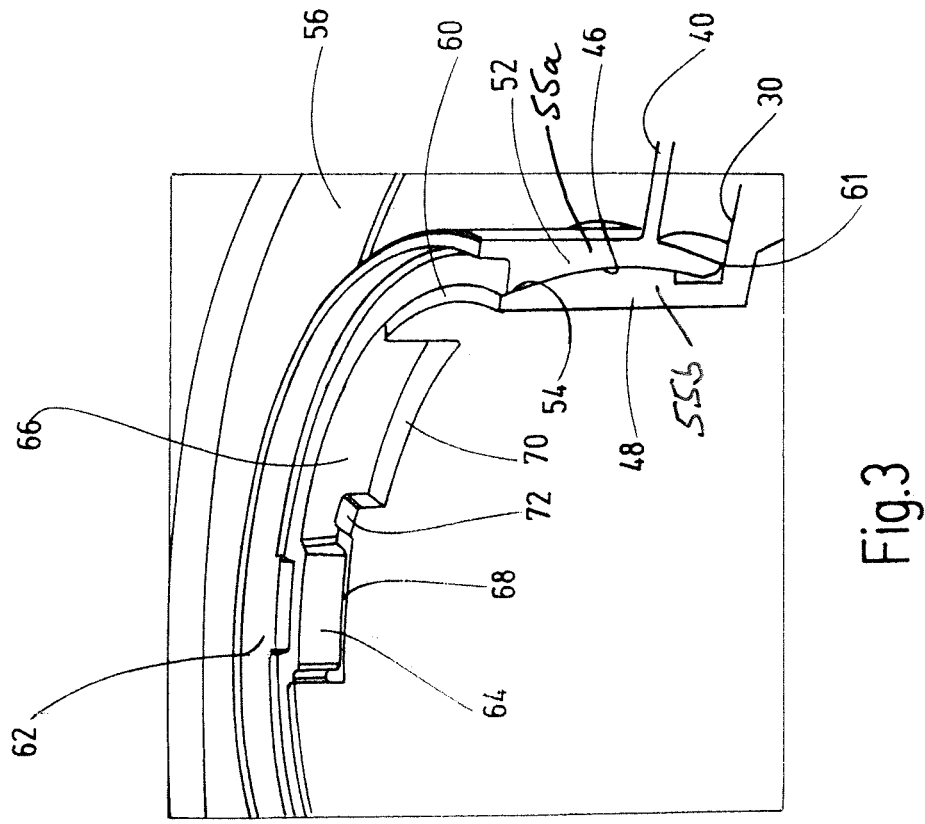
FIG. 3 is a further enlarged partial perspective view in section, showing the area of two blocking devices of the exemplary embodiment, both shown in the blocking position.

The spherical bearing formed permits a deflection of two different longitudinal axes at an angle, particularly perpendicularly, to one another of the element receptacle 14 relative to the filter element 15 from the aligned basic position as shown in FIGS. 1 and 2. In this aligned position, the lower edge 61 of the tubular body 52 of the end cap 40 is spaced apart from the top surface 30 of the element receptacle 14. In contrast, FIGS. 3 and 4 show a deflected state, or more precisely, the maximum possible deflection at which the lower edge 60 of the annular body 52 contacts the cover surface 30, forming a stop, of the element receptacle 14. This arrangement forms a blocking device delimiting the maximum deflection.

FIGS. 2 to 4 show closer details of a further or second blocking device formed by formations on the upper end edge 60 of the tubular body 48 of the element receptacle 14 and the upper end edge 62 of the tubular body 52 of the end cap 40. As shown, this second blocking device has a locking block 64, projecting radially inwards from the inside of the end edge 62 of the tubular body 52 and having the form of a short rectangular rib. At the end edge 60 of the other, inner tubular body 48, a recess 66 is formed, which recess 66 extends in steps 68 and 70 (see in particular FIGS. 3 and 4) across one circumferential section of the tubular body 48 each. In the first step 68, the recess 66 forms an axial deepening of the end edge 62 corresponding to the axial thickness of the locking block 64 and is limited in the circumferential direction by a projection 72. Projection 72 protrudes slightly from the step surface, to a circumferential length only slightly greater than the length of the locking block 64 measured in the circumferential direction, see FIG. 3. The second step 70 adjoins the first step 68 at the projection 72. The second step results in the end edge 62 being further recessed in the axial direction and has a greater circumferential length than the first step 68.

In this arrangement, the function of this further or second blocking device is as follows: FIGS. 2 and 3 show the basic position in which the axis of filter element 15 together with the end cap 40 is aligned with the longitudinal axis of the element receptacle 14. The locking body 64 of the end cap 40 is located in the first step 68 of the recess 66 of the tubular body 48 of the element receptacle 14. Because the axial extension of the first step 68 corresponds to the thickness of the locking block 64 measured in the axial direction, the spherical bearing is blocked against deflection. At the same time, the projection 72 impedes the sliding motion of the locking block 64 in the circumferential direction, so that in this basic position a rotational interlock is formed between the filter element 15 and the element receptacle 14. In the basic position, therefore, during the assembly process for installing the filter element 15 in the filter housing 2, the filter element 15 together with the element receptacle 14, forming a rigid unit therewith, can be conveniently and securely placed against the threaded ring 26 of the housing mount 6 and screwed tight by the rotary catch formed. When the screw connection is formed, the rotational interlock, formed by the projection 72, can be overcome by further rotation such that the locking block 64 overruns the projection 72 and enters the free space formed by the second step 70 of the recess 66. Due to the increased axial depth of the step 70, the locking block 64 is no longer axially supported, permitting the spherical bearing to be released and within the limits formed by the first blocking device to be deflected to compensate for misalignment.

The other, upper end cap 42, in the exemplary embodiment shown, see FIG. 1, engages with an element receptacle formed by a connector 74 that engages with the central opening 76 of the end cap 42. Instead of this form-fit engagement, a spherical bearing of the type shown on the lower end cap 40 can also be provided between the upper end cap 42 and the element receptacle concerned. The connector 74, provided in the example shown, is constituent part of a housing cover 78 that is removably secured to a filter head 80 using screw connections 85. The filter head 80 has an unfiltered input 82 and, as per usual for in-tank filter devices, is attached to an opening in a tank wall not shown. In the functional position shown in FIG. 1, the end 28 of the threaded ring 26 and the end edge 38 of the element receptacle 14 are in close contact with the circular ring surface 20 of the housing mount 6. For the unfiltered matter gaining access to the bypass valves in the lower part 16 of the housing mount 6, the annular space 36 located inside the sleeve 32 forms an inflow space into which unfiltered matter enters via the wall openings 34. Openings 84 are provided in the circular ring surface 20, forming the bottom of this annular space 36. The openings 84 are normally closed by the closing bodies 24 of the respective bypass valve. Injected screen grids may be provided at the wall openings 34 of the sleeve 32 to provide filtration of the flow of unfiltered matter when a bypass valve is opened by pressure. In an embodiment not shown, it is also possible to relocate the spherical bearing presented from the lower to the upper element end, or to provide such a bearing at both element ends.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having a first housing mount therein;
a filter element being accommodated in the filter housing, the filter element having an element receptacle and an element material being capable of filtering a liquid and extending between first and second end caps, the element receptacle, the element material and the first and second end caps being formed as a connected unit insertable together in the filter housing for connection to the first housing mount, the first end cap being mounted on the element receptacle, the element receptacle having a housing connector on a side of the receptacle element remote from the first end cap and being releasably connected to the first housing mount;
the filter element further including a bearing connecting the first end cap and the element receptacle and having at least two degrees of freedom relative to two different axes and such that the first end cap is capable of being articulated on the element receptacle, the bearing having a convex bearing surface guided in a concave bearing surface, the convex and concave bearing surfaces being parts of first and second shells, respectively, at least one of the first and second shells having a passage for liquid media.

2. The filter device according to claim 1 wherein
the convex bearing surface is part of the element receptacle; and
the concave bearing surface is part of the first end cap.

3. The filter device according to claim 1 wherein
the convex and concave bearing surfaces are in contact with each other in a plug-in or clamp connection and are spherical.

4. The filter device according to claim 1 wherein
the first housing mount is immovably secured in the filter housing.

5. The filter device according to claim 1 wherein
the element receptacle is secured to the first housing mount in the filter housing by a screw connection.

6. The filter device according to claim 1 wherein
a longitudinal axis of the filter element is capable of being swiveled out of coaxial alignment with a longitudinal axis of the element receptacle in all directions by a predeterminable swivel angle by the convex and concave bearing surfaces.

7. The filter device according to claim 6 wherein
a first blocker delimits the swivel angle to a maximum possible deflection angle of the filter element, the first blocker acting between the first end cap of the filter element and the element receptacle and being formed by the first end cap and the element receptacle.

8. The filter device according to claim 6 wherein
the housing connector of the element receptacle is threaded to the first housing mount inside the filter housing;
a second blocker releasably prevents relative rotation of the first end cap and the element receptacle about the about the longitudinal axes of the first end cap and the element receptacle and a swivel motion out of a basic position in which the longitudinal axes of the first end cap and the element receptacle are congruent with each other; and
when the element receptacle is secured to the first housing mount and further rotational motion of the first end cap relative to the element receptacle in the screw-on direction, the second blocker permits the swivel motion from the basic position.

9. The filter device according to claim 8 wherein
the second end cap of the filter element is secured to a second housing mount inside the filter housing.

10. The filter device according to claim 9 wherein
the second housing mount is part of a housing cover secured to a filter head as part of the filter housing.

11. The filter device according to claim 10 wherein
the housing cover is secured to the filter head by at least one screw connection.

12. The filter device according to claim 1 wherein
the first housing mount in the filter housing and has at least one spring-loaded bypass valve, the by-pass valve at least partially bypassing the filter element releasing a fluid path from the inside of the filter housing to an outlet of the filter housing in an open position of the by-pass valve.

13. The filter device according to claim 1 wherein
the two different axes are at an angle to one another.

14. A filter element, comprising:
an element receptacle having a housing connector;
an element material arranged between first and second end caps and delimiting an inner cavity, the element receptacle, the element material and the first and second end caps being formed as a connected unit insertable together in a filter housing capable of a releasable connection to a first housing mount in the filter housing by the housing connector on a side of the receptacle element remote from the first end cap;
a bearing connecting the first end cap and the element receptacle and having at least two degrees of freedom relative to two different axes such that the first end cap is capable of being articulated on the element receptacle, the bearing having a convex bearing surface guided in a concave bearing surface, the convex and concave bearing surfaces being parts of first and second shells; and
a passage in the bearing for liquid media, the passage being connected to the inner cavity in a fluid communication.

15. The filter device according to claim 14 wherein
a longitudinal axis of the filter element is capable of being swiveled out of coaxial alignment with a longitudinal axis of the element receptacle in all directions by a predeterminable swivel angle by the convex and concave bearing surfaces.

16. The filter device according to claim 15 wherein
a first blocker delimits the swivel angle to a maximum possible deflection angle of the filter element, the first blocker acting between the first end cap of the filter element and the element receptacle and being formed by the first end cap and the element receptacle.

17. The filter element according to claim 1 wherein
the convex and concave bearing surfaces are spherically shaped.

18. The filter element according to claim 14 wherein
the convex and concave bearing surfaces are spherically shaped.

19. The filter element according to claim 7 wherein
the first blocker comprises a lower edge of a tubular body of the first end cap and a top surface of the element receptacle.

20. The filter element according to claim 8 wherein
the second blocker comprises a recess in an end edge of a tubular body of one of the element receptacle or the first end cap and comprises a locking block extending radially from an end edge on a tubular body of the other of the element receptacle or the first end cap, the recess including first and second steps with the second step having a greater axial depth and length than the first step and including an axially extending projection between the first and second steps, the locking block having an axial depth equal to the axial depth of the first step.

21. The filter element according to claim 16 wherein
the first blocker comprises a lower edge of a tubular body of the first end cap and a top surface of the element receptacle.

22. The filter device according to claim 15 wherein
the housing connector of the element receptacle comprises an axially extending thread; and
a second blocker releasably prevents relative rotation of the first end cap and the element receptacle about the about the longitudinal axes of the first end cap and the element receptacle and a swivel motion out of a basic position in which the longitudinal axes of the first end cap and the element receptacle are congruent with each other.

23. The filter element according to claim 22 wherein
the second blocker comprises a recess in an end edge of a tubular body of one of the element receptacle or the first end cap and comprises a locking block extending radially from an end edge on a tubular body of the other of the element receptacle or the first end cap, the recess including first and second steps with the second step having a greater axial depth and length than the first step and including an axially extending projection between the first and second steps, the locking block having an axial depth equal to the axial depth of the first step.

* * * * *